US012804752B2

(12) United States Patent
Zhou et al.

(10) Patent No.: US 12,804,752 B2
(45) Date of Patent: Nov. 17, 2026

(54) METHOD, DEVICE AND COMPUTER PROGRAM PRODUCT FOR SECONDARY CELL GROUP ACTIVATION AND DEACTIVATION IN WIRELESS COMMUNICATION

(71) Applicant: ZTE CORPORATION, Shenzhen (CN)

(72) Inventors: Yingjun Zhou, Shenzhen (CN); Zijiang Ma, Shenzhen (CN); Yin Gao, Shenzhen (CN); Dapeng Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 323 days.

(21) Appl. No.: 18/623,275

(22) Filed: Apr. 1, 2024

(65) Prior Publication Data

US 2024/0349376 A1 Oct. 17, 2024

Related U.S. Application Data

(63) Continuation of application No. PCT/CN2021/124145, filed on Oct. 15, 2021.

(51) Int. Cl.
*H04W 76/15* (2018.01)
*H04W 76/34* (2018.01)

(52) U.S. Cl.
CPC ........... *H04W 76/15* (2018.02); *H04W 76/34* (2018.02)

(58) Field of Classification Search
CPC ...... H04W 76/15; H04W 76/34; H04L 5/0098
See application file for complete search history.

(56) References Cited

U.S. PATENT DOCUMENTS

| | | | | |
|---|---|---|---|---|
| 2020/0374964 | A1* | 11/2020 | Wang | H04L 5/00 |
| 2023/0354110 | A1* | 11/2023 | Wang | H04W 76/20 |
| 2023/0397273 | A1* | 12/2023 | Xu | H04W 76/27 |
| 2023/0413356 | A1* | 12/2023 | Wu | H04W 76/27 |
| 2024/0138004 | A1* | 4/2024 | Wu | H04W 88/06 |

FOREIGN PATENT DOCUMENTS

| | | | |
|---|---|---|---|
| WO | WO-2020/029196 | A1 | 2/2020 |
| WO | WO-2020/167028 | A1 | 8/2020 |

OTHER PUBLICATIONS

3rd Generation Partnership Project, "Technical Specification Group Radio Access Network; Evolved Universal Terrestrial Radio Access (E-UTRA) and NR; Multi connectivity; Stage 2 (Release 15)", 3GPP TS 37.340, V15.14.0, Sep. 2021, (73 pages).

(Continued)

*Primary Examiner* — Chae S Lee
(74) *Attorney, Agent, or Firm* — Foley & Lardner LLP

(57) ABSTRACT

Method, device and computer program product for wireless communication are provided. A method includes: receiving, by a first wireless communication node from a second wireless communication node, a first request message comprising activation or deactivation assisting information of a secondary cell group, SCG; and transmitting, by the first wireless communication node to a third wireless communication node, a second request message in response to the activation or deactivation assisting information to activate or deactivate the SCG.

16 Claims, 12 Drawing Sheets

(56) References Cited

OTHER PUBLICATIONS

3rd Generation Partnership Project, "Technical Specification Group Radio Access Network; W1 interface; Application Protocol (W1AP) (Release 16)", 3GPP TS 37.473, V16.6.0, Oct. 2021, (143 pages).
International Search Report and Written Opinion for PCT Appl. No. PCT/CN2021/124145 mailed Feb. 21, 2022, (9 pages).
NEC,"Rapporteur updating of specification 38.401", 3GPP TSG-RAN WG3 #107-e, R3-200352, Mar. 6, 2020, Electronic Meeting (45 pages).
ZTE (Moderator), "Summary of Offline Discussion on MRDC2—SCG (de)activation", 3GPP TSG-RAN WG3 #111-e, R3-211132, Feb. 4, 2021, Online (35 pages).
ZTE, "TP for SCG BL draftCR to TS37.340", 3GPP TSG-RAN WG3 #112-e, R3-211600, May 28, 2021, Online (19 pages).
CATT: "Discussion on Deactivation of SCG", 3GPP Draft; R2-2108691, 3rd Generation Partnership Project (3GPP), RAN WG2, electronic; Aug. 16, 2021-Aug. 27, 2021 Aug. 6, 2021 (Aug. 6, 2021), XP052035026, Retrieved from the Internet: URL:https://ftp.3gpp.org/tsg_ran/WG2_RL2/TSGR2_115-e/Docs/R2-2108691.zip R2-2108691.docx [retrieved on Aug. 6, 2021] (3 pages).
Extended European Search Report for EP Appl. No. 21960301.6, dated Apr. 17, 2025 (9 pages).
Huawei: "Support of SCG activation and deactivation", 3GPP Draft; R3-212988, 3rd Generation Partnership Project (3GPP), RAN WG3, E-meeting; May 17, 2021-May 27, 2021 Jun. 5, 2021 (Jun. 5, 2021), XP052022911, Retrieved from the Internet: URL:https://ftp.3gpp.org/tsg_ran/WG3_lu/TSGR3_112-e/Inbox/R3-212988.zip R3-212988 SCG BL CR To TS 38.401.docx [retrieved on Jun. 5, 2021] (6 pages).
NEC: "SCG Activation / deactivation discussion on F1", 3GPP Draft; R3-211677, 3rd Generation Partnership Project (3GPP), RAN WG3, E-meeting; May 17, 2021-May 28, 2021 May 7, 2021 (May 7, 2021), XP052001989, Retrieved from the Internet:URL:https://ftp.3gpp.org/tsg_ran/WG3_lu/TSGR3_112-e/Docs/R3-211677.zip R3-211677-SCG-activation-deactivation-F1-disc.docx [retrieved on May 7, 2021] (3 pages).

* cited by examiner transmitting, by a second wireless communication node to a first wireless communication node, a first request message comprising activation or deactivation assisting information of an SCG, to request the first wireless communication node to activate or deactivate the SCG and transmit a second request message to a third wireless communication node .

FIG. 11 receiving, by a third wireless communication node from a first wireless communication node, a second request message to activate or deactivate an SCG

FIG. 12

METHOD, DEVICE AND COMPUTER PROGRAM PRODUCT FOR SECONDARY CELL GROUP ACTIVATION AND DEACTIVATION IN WIRELESS COMMUNICATION

CROSS-REFERENCE TO RELATED PATENT APPLICATIONS

This application is a Continuation of PCT Application No. PCT/CN2021/124145, filed Oct. 15, 2021, incorporated herein by reference in its entirety.

TECHNICAL FIELD

This document is directed generally to wireless communications, in particular to $5^{th}$ generation (5G) wireless communication.

BACKGROUND

Xn and F1 signaling procedures support SCG (Secondary Cell Group) deactivation and activation during SN (Secondary Node) initiated SN modification. The CU (Central Unit) may make the final decision of SCG deactivation or activation based on information obtained from the DU (Distributed Unit).

SUMMARY

In some approaches, the SN-CU (Secondary Node Central Unit) or SN-CU-CP (Secondary Node-Central Unit-Control Plane) initiates the SCG deactivation and activation through the SN modification required procedure. However, the method for providing information to the SN-CU or SN-CU-CP to allow the SN-CU or SN-CU-CP to perform SCG activation or deactivation is still unclear.

The present disclosure relates to methods, devices, and computer program products for wireless communication for SCG deactivation and/or activation.

One aspect of the present disclosure relates to a wireless communication method. In an embodiment, the wireless communication method includes: receiving, by a first wireless communication node from a second wireless communication node, a first request message comprising activation or deactivation assisting information of a secondary cell group, SCG; and transmitting, by the first wireless communication node to a third wireless communication node, a second request message in response to the activation or deactivation assisting information to activate or deactivate the SCG.

Another aspect of the present disclosure relates to a wireless communication method. In an embodiment, the wireless communication method includes transmitting, by a second wireless communication node to a first wireless communication node, a first request message comprising activation or deactivation assisting information of a secondary cell group, SCG, to request the first wireless communication node to activate or deactivate the SCG and transmit a second request message to a third wireless communication node.

Another aspect of the present disclosure relates to a wireless communication method. In an embodiment, the wireless communication method includes receiving, by a third wireless communication node from a first wireless communication node, a second request message to activate or deactivate a secondary cell group, SCG; wherein the second request message is transmitted by the first wireless communication node according to a first request message from a second wireless communication node comprising activation or deactivation assisting information of the SCG.

Another aspect of the present disclosure relates to a wireless communication node. In an embodiment, the wireless communication node includes a communication unit and a processor. The processor is configured to: receive, from a second wireless communication node, a first request message comprising activation or deactivation assisting information of a secondary cell group, SCG; and transmit, to a third wireless communication node, a second request message in response to the activation or deactivation assisting information to activate or deactivate the SCG.

Another aspect of the present disclosure relates to a wireless communication node. In an embodiment, the wireless communication node includes a communication unit and a processor. The processor is configured to: transmit, to a first wireless communication node, a first request message comprising activation or deactivation assisting information of a secondary cell group, SCG, to request the first wireless communication node to activate or deactivate the SCG and transmit a second request message to a third wireless communication node.

Another aspect of the present disclosure relates to a wireless communication node. In an embodiment, the wireless communication node includes a communication unit and a processor. The processor is configured to: receive, from a first wireless communication node, a second request message to activate or deactivate a secondary cell group, SCG; wherein the second request message is transmitted by the first wireless communication node according to a first request message from a second wireless communication node comprising activation or deactivation assisting information of the SCG.

Various embodiments may preferably implement the following features:

Preferably or in some embodiments, the first wireless communication node is configured to receive a first response message from the third wireless communication node and transmit a second response message to the second wireless communication according to the first response message.

Preferably or in some embodiments, the first wireless communication node is configured to receive a first confirm message from the third wireless communication node and transmit a second confirm message to the second wireless communication to confirm an activation or a deactivation of the SCG according to the first confirm message.

Preferably or in some embodiments, the first wireless communication node is configured to receive a first refuse message from the third wireless communication node and transmit a second refuse message to the second wireless communication to refuse an activation or a deactivation of the SCG according to the first refuse message.

Preferably or in some embodiments, the first wireless communication node is configured to receive a release request message from the second wireless communication node to release a connection in response to refusing the activation or the deactivation of the SCG.

Preferably or in some embodiments, the first wireless communication node is configured to receive a response message from the third wireless communication node and determine whether to transmit a deactivation request or an activation request to the second wireless communication according to the response message.

Preferably or in some embodiments, the first wireless communication node is configured to transmit a confirm message to the second wireless communication to confirm an activation or a deactivation of the SCG before receiving the response message from the third wireless communication node.

Preferably or in some embodiments, the first wireless communication node is configured to receive a refuse message from the third wireless communication node and transmit a deactivation request or an activation request to the second wireless communication according to the refuse message.

Preferably or in some embodiments, the first wireless communication node is configured to transmit a deactivation request to the second wireless communication node to request the second wireless communication node to deactivate the activated SCG in response to a refuse message from the third wireless communication node and the first request message comprising the activation assisting information.

Preferably or in some embodiments, the first wireless communication node is configured to transmit an activation request to the second wireless communication node to request the second wireless communication node to activate the deactivated SCG in response to a refuse message from the third wireless communication node and the first request message comprising the deactivation assisting information.

Preferably or in some embodiments, the first wireless communication node is configured to receive a first modification request message from the third wireless communication node and transmit a first modification response message to the third wireless communication according to the first modification request message.

Preferably or in some embodiments, the first wireless communication node is configured to transmit a second modification request message to the second wireless communication node and receive a second modification response message from the second wireless communication, or the first wireless communication node is configured to receive the second modification request message from the second wireless communication node and transmit the second modification response message to the second wireless communication according to the second modification request message.

Preferably or in some embodiments, the second wireless communication node is configured to receive a second response message from the first wireless communication node, and the second response message is transmitted by the first wireless communication node according to a first response message provided by the third wireless communication node.

Preferably or in some embodiments, the second wireless communication node is configured to receive a second confirm message from the first wireless communication node to confirm an activation or a deactivation of the SCG, and the second confirm message is transmitted by the first wireless communication node according to a first confirm message provided by the third wireless communication node.

Preferably or in some embodiments, the second wireless communication node is configured to receive a second refuse message from the first wireless communication node to refuse an activation or a deactivation of the SCG, and the second refuse message is transmitted by the first wireless communication node according to a first refuse message provided by the third wireless communication node.

Preferably or in some embodiments, the second wireless communication node is configured to transmit a release request message to the first wireless communication node to release a connection in response to the second refuse message.

Preferably or in some embodiments, the second wireless communication node is configured to receive a deactivation request or an activation request from the first wireless communication node in response to the first wireless communication node receiving a refuse message from the third wireless communication node.

Preferably or in some embodiments, the second wireless communication node is configured to receive a confirm message to confirm an activation or a deactivation of the SCG before receiving the deactivation request or the activation request from the first wireless communication node.

Preferably or in some embodiments, the second wireless communication node is configured to receive a deactivation request to deactivate the activated SCG in response to the first wireless communication node receiving a refuse message from the third wireless communication node and the first request message comprising the activation assisting information.

Preferably or in some embodiments, the second wireless communication node is configured to receive an activation request to activate the deactivated SCG in response to the first wireless communication node receiving a refuse message from the third wireless communication node and the first request message comprising the deactivation assisting information.

Preferably or in some embodiments, the second wireless communication node is configured to receive a second modification request message from the first wireless communication node and transmit a second modification response message to the first wireless communication according to the second modification request message, or the second wireless communication node is configured to transmit the second modification request message to the first wireless communication node and receive the second modification response message from the first wireless communication.

Preferably or in some embodiments, the third wireless communication node is configured to transmit a first response message to the first wireless communication node, to allow the first wireless communication node to transmit a second response message to the second wireless communication according to the first response message.

Preferably or in some embodiments, the third wireless communication node is configured to transmit a first confirm message to the first wireless communication node, to allow the first wireless communication node to transmit a second confirm message to the second wireless communication to confirm an activation or a deactivation of the SCG according to the first confirm message.

Preferably or in some embodiments, the third wireless communication node is configured to transmit a first refuse message to the first wireless communication node, to allow the first wireless communication node to transmit a second refuse message to the second wireless communication to refuse an activation or a deactivation of the SCG according to the first refuse message.

Preferably or in some embodiments, the third wireless communication node is configured to transmit a response message to the first wireless communication node, to allow the first wireless communication node to determine whether to transmit a deactivation request or an activation request to the second wireless communication according to the response message.

Preferably or in some embodiments, the third wireless communication node is configured to transmit a refuse message to the first wireless communication node, to allow the first wireless communication node to activate or deactivate the deactivated or activated SCG in response to the refuse message.

Preferably or in some embodiments, the third wireless communication node is configured to transmit a refuse message to the first wireless communication node, to allow the first wireless communication node to request the second wireless communication node to deactivate the activated SCG in response to the first request message comprising the activation assisting information.

Preferably or in some embodiments, the third wireless communication node is configured to transmit a refuse message to the first wireless communication node, to allow the first wireless communication node to request the second wireless communication node to activate the deactivated SCG in response to the first request message comprising the deactivation assisting information.

Preferably or in some embodiments, the third wireless communication node is configured to transmit a first modification request message to the first wireless communication node and receive a first modification response message from the first wireless communication.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIG. 11 shows a flowchart of another wireless communication method according to an embodiment of the present disclosure.

FIG. 12 shows a flowchart of another wireless communication method according to an embodiment of the present disclosure.

DETAILED DESCRIPTION

In some embodiments, in MR-DC (Multi-Radio Dual Connectivity), a UE (user equipment) with multiple receiving or transmitting capability is configured to use resources from two nodes, in which one provides NR (New Radio) access and the other one provides either E-UTRA (Evolved Universal Terrestrial Radio Access) or NR access. In an embodiment, one node acts as the MN (Master Node), and the other node acts as the SN (Secondary Node) in MR-DC.

In some embodiments, a gNB (gNodeB) includes a gNB-CU (gNodeB Central Unit) and one or more gNB-DUs (gNodeB Central Units). One gNB-DU is connected to only one gNB-CU via the F1 interface.

In some embodiments of the present disclosure, an SN-CU (Secondary Node Central Unit) is based on assisting information from the SN-DU to make a decision for SCG deactivation and/or activation. In some embodiments of the present disclosure, the UE Context Modification Required message is used to provide the assisting information for SCG deactivation and/or activation to the CU. Furthermore, after receiving the assisting information for SCG deactivation or activation from the SN-DU, two schemes may be adopted by the SN-CU for SCG deactivation or activation, including a nested method and a non-nested method.

Note that these two schemes can also be regarded as schemes to support a DU initiated SCG deactivation and/or activation. The term "DU initiated" indicates that the procedure is initiated by the SN-DU to provide the SCG deactivation and/or activation assisting information to the SN-CU (e.g., via the UE Context Modification Required message). The SN-CU makes the decision of SCG deactivation and/or activation based on the assisting information from the SN-DU and/or based on a response from the MN.

Figure 1:
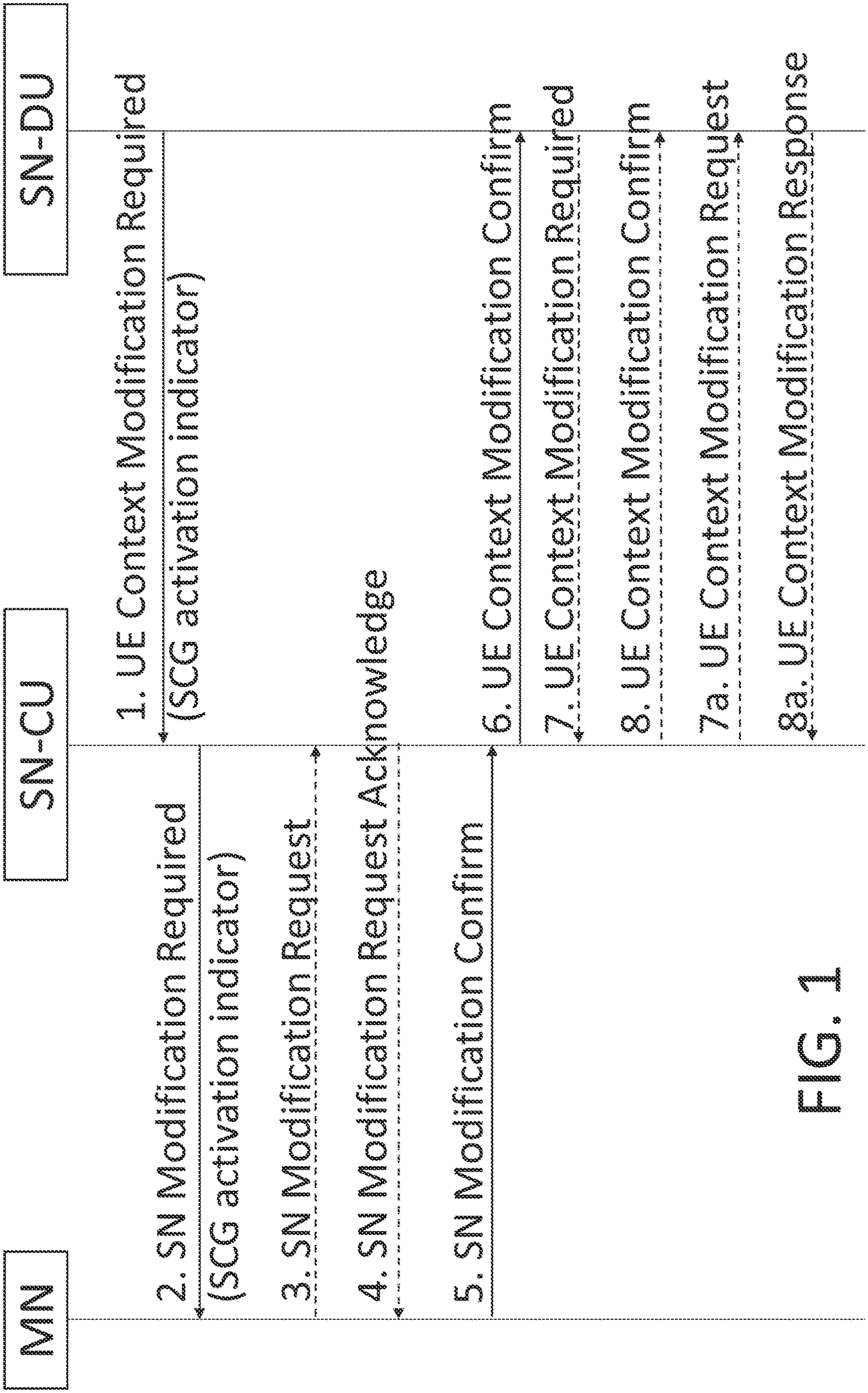
FIG. 1 shows a schematic diagram of a procedure for SCG activation according to an embodiment of the present disclosure.

Embodiment 1) Successful Operation of Du Initiated SCG Activation Based on Nested Method FIG. 1 shows a schematic diagram of a procedure for SCG activation according to an embodiment of the present disclosure.

Step 1: The SN-DU sends a request message (e.g., a UE Context Modification Required message) including SCG assisting information to SN-CU to provide an SCG activation suggestion. For example, the request message (e.g., the UE Context Modification Required message) may include an SCG Activation Status IE (information element) with an indication "SCG activated" (e.g., an SCG activation indicator). The assisting information is sent to allow the SN-CU to acknowledge the SCG status.

Step 2: The SN-CU determines to request an SCG activation and sends another request message (e.g., an SN Modification Required message) to the MN. In an embodiment, the request message (e.g., an SN Modification Required message) includes an SCG Activation Status IE with an indication "SCG activated" (e.g., an SCG activation indicator).

Step 3: The MN may initiate a modification procedure (e.g., an SN Modification procedure) according to the request message from the SN-CU, such as performing configuration changes or providing information like data forwarding addresses, a new SN security key, and/or a measurement gap. In an embodiment, the MN may send a request message (e.g., an SN Modification Request message) to the SN-CU.

Step 4: Following Step 3, the SN-CU may send an acknowledge message (e.g., an SN Modification Acknowledge message) to the MN. Note that the operations in Steps 3 and 4 may be omitted in some conditions, such as no further information or changes are required.

Step 5: The MN sends a confirm message (e.g., an SN Modification Confirm message) to the SN-CU to indicate that the request message for SCG activation from the SN-CU in Step 2 is accepted.

Step 6: The SN-CU sends another confirm message (e.g., a UE Context Modification Confirm message) to the SN-DU to indicate that the SCG is activated.

Step 7: A modification procedure (e.g., a UE Context Modification Required procedure) may be triggered by the SN-DU to further modify the established UE Context in some scenarios, such as modifying and releasing radio bearer resources. This procedure may not be triggered in some scenarios, e.g., no further modifications are required. For example, in an embodiment, the SN-DU may send a modification request message (e.g., a UE Context Modification Required message) to the SN-CU.

Step 8: Following Step 7, the SN-CU may send a modification confirm message (e.g., a UE Context Modification Confirm message) to the SN-DU. Note that the operations in Steps 7 and 8 may be omitted on the basis of actual requirements.

Step 7*a*: A modification procedure (e.g., a UE Context Modification procedure) may be triggered by the SN-CU to further modify the established UE Context in some scenarios, such as modifying and releasing radio bearer resources. This procedure may not be triggered in some scenarios, e.g., no further modifications are required. For example, in an embodiment, the SN-CU may send a modification request message (e.g., a UE Context Modification Request message) to the SN-DU.

Step 8*a*: Following Step 7*a*, the SN-DU may send a modification response message (e.g., a UE Context Modification Response message) to the SN-CU. Note that the operations in Steps 7*a* and 8*a* may be omitted on the basis of actual requirements.

Note that the order of Steps 7 and 8 and Steps 7*a* and 8*a* can be altered, and the present disclosure is not limited to the embodiment above.

Figure 2:
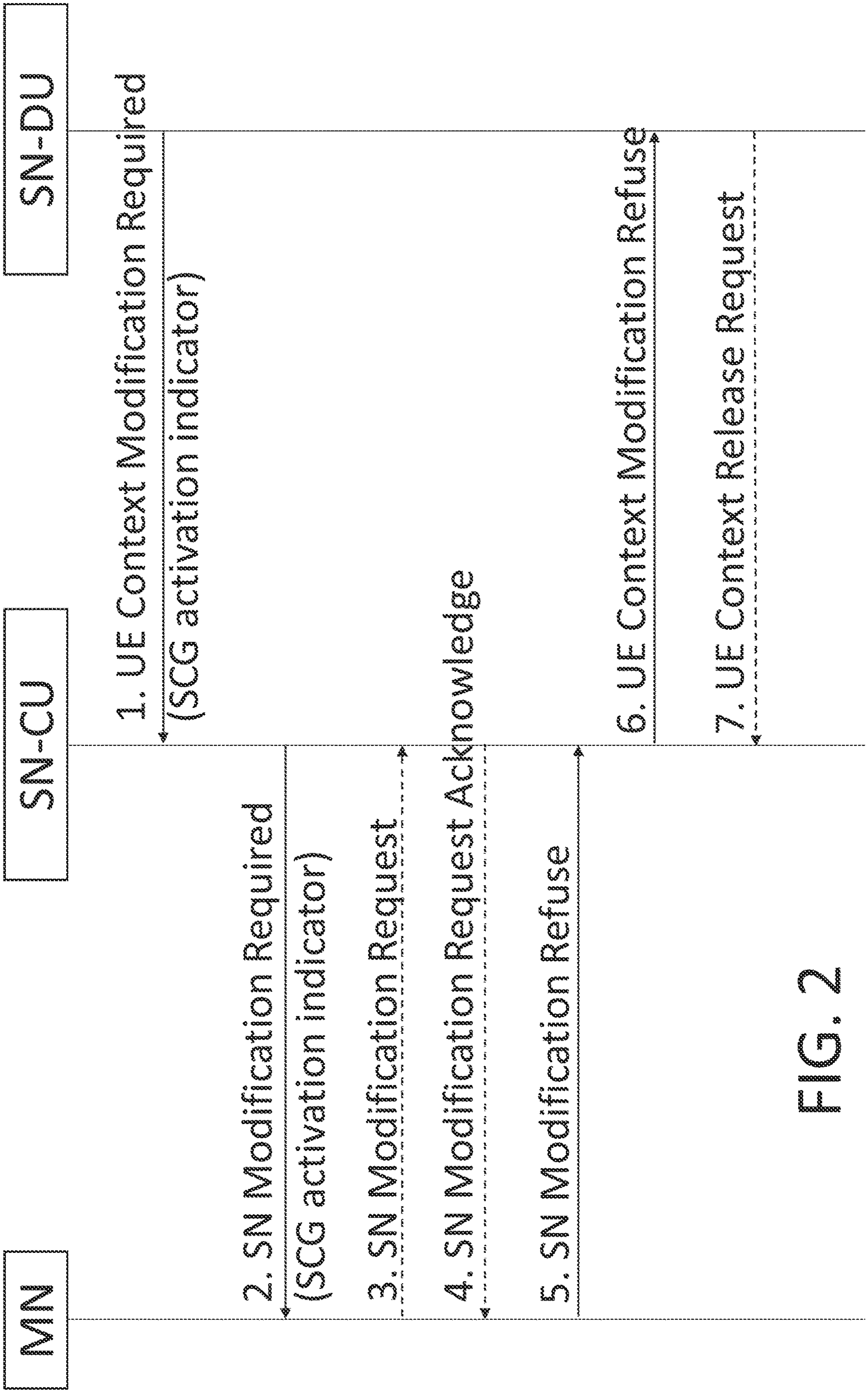
FIG. 2 shows a schematic diagram of a procedure for SCG activation according to an embodiment of the present disclosure.

Embodiment 2) Unsuccessful Operation of Du Initiated SCG Activation Based on Nested Method FIG. 2 shows a schematic diagram of another procedure for SCG activation according to an embodiment of the present disclosure.

Steps 1 to 4 in this embodiment are similar or identical to Steps 1 to 4 in Embodiment 1, and are not repeated herein.

Step 5: The MN sends a refuse message (e.g., an SN Modification Refuse message) to the SN-CU to indicate that the SCG activation request is rejected. In an embodiment, the refuse message includes a cause value of "Requested SCG state not available" in the Cause IE.

Step 6: The SN-CU sends another refuse message (e.g., a UE Context Modification Refuse message) to the SN-DU to indicate that the SCG activation request is rejected. In an embodiment, the refuse message includes a cause value of "Requested SCG state not available" in the Cause IE.

Step 7: A release procedure (e.g., a UE Context Release Request procedure) may be triggered by the SN-DU or the SN-CU in some scenarios. For example, the SN-DU may transmit a UE Context Release Request message to the SN-CU with the cause value of "Requested SCG state not available" in the Cause IE, so as to release the UE-associated logical F1-connection. Note that this procedure may not be triggered in some scenarios, e.g., the UE-associated logical F1-connection is still needed.

Figure 3:
FIG. 3 shows a schematic diagram of another procedure for SCG deactivation according to an embodiment of the present disclosure.

Embodiment 3) Successful Operation of Du Initiated SCG Deactivation Based on Nested Method FIG. 3 shows a schematic diagram of a procedure for SCG deactivation according to an embodiment of the present disclosure.

Step 1: The SN-DU sends a request message (e.g., a UE Context Modification Required message) including SCG assisting information to SN-CU to provide an SCG deactivation suggestion. For example, the request message (e.g., the UE Context Modification Required message) may include an SCG Deactivation Status IE with an indication "SCG deactivated" (e.g., an SCG deactivation indicator). The assisting information is sent to allow the SN-CU to acknowledge the SCG status.

Step 2: The SN-CU determines to request an SCG deactivation and sends another request message (e.g., an SN Modification Required message) to the MN. In an embodiment, the request message (e.g., an SN Modification Required message) includes an SCG Deactivation Status IE with an indication "SCG deactivated" (e.g., an SCG deactivation indicator).

Steps 3 to 4 in this embodiment are similar or identical to Steps 3 to 4 in Embodiment 1, and are not described herein.

Step 5: The MN sends a confirm message (e.g., an SN Modification Confirm message) to the SN-CU to indicate that the request message for SCG deactivation from the SN-CU in Step 2 is accepted.

Step 6: The SN-CU sends another confirm message (e.g., a UE Context Modification Confirm message) to the SN-DU to indicate that the SCG is deactivated.

Steps 7 to 8 in this embodiment are similar or identical to Steps 7 to 8 in Embodiment 1, and are not described herein.

Steps 7*a* to 8*a* in this embodiment are similar or identical to Steps 7*a* to 8*a* in Embodiment 1, and are not described herein.

Figure 4:
FIG. 4 shows a schematic diagram of another procedure for SCG deactivation according to an embodiment of the present disclosure.

Embodiment 4) Unsuccessful Operation of Du Initiated SCG Deactivation Based on Nested Method FIG. 4 shows a schematic diagram of another procedure for SCG deactivation according to an embodiment of the present disclosure.

Steps 1 to 4 in this embodiment are similar or identical to Steps 1 to 4 in Embodiment 3, and are not described herein.

Step 5: The MN sends a Refuse message (e.g., an SN Modification Refuse message) to the SN-CU to indicate that the request message for SCG deactivation from the SN-CU is rejected. In an embodiment, the confirm message includes a cause value of "Requested SCG state not available" in the Cause IE.

Step 6: The SN-CU sends another refuse message (e.g., a UE Context Modification Refuse message) to the SN-DU to indicate that the SCG is deactivated. In an embodiment, the confirm message includes a cause value of "Requested SCG state not available" in the Cause IE.

Step 7 in this embodiment is similar or identical to Step 7 in Embodiment 2, and is not described herein.

Figure 5:
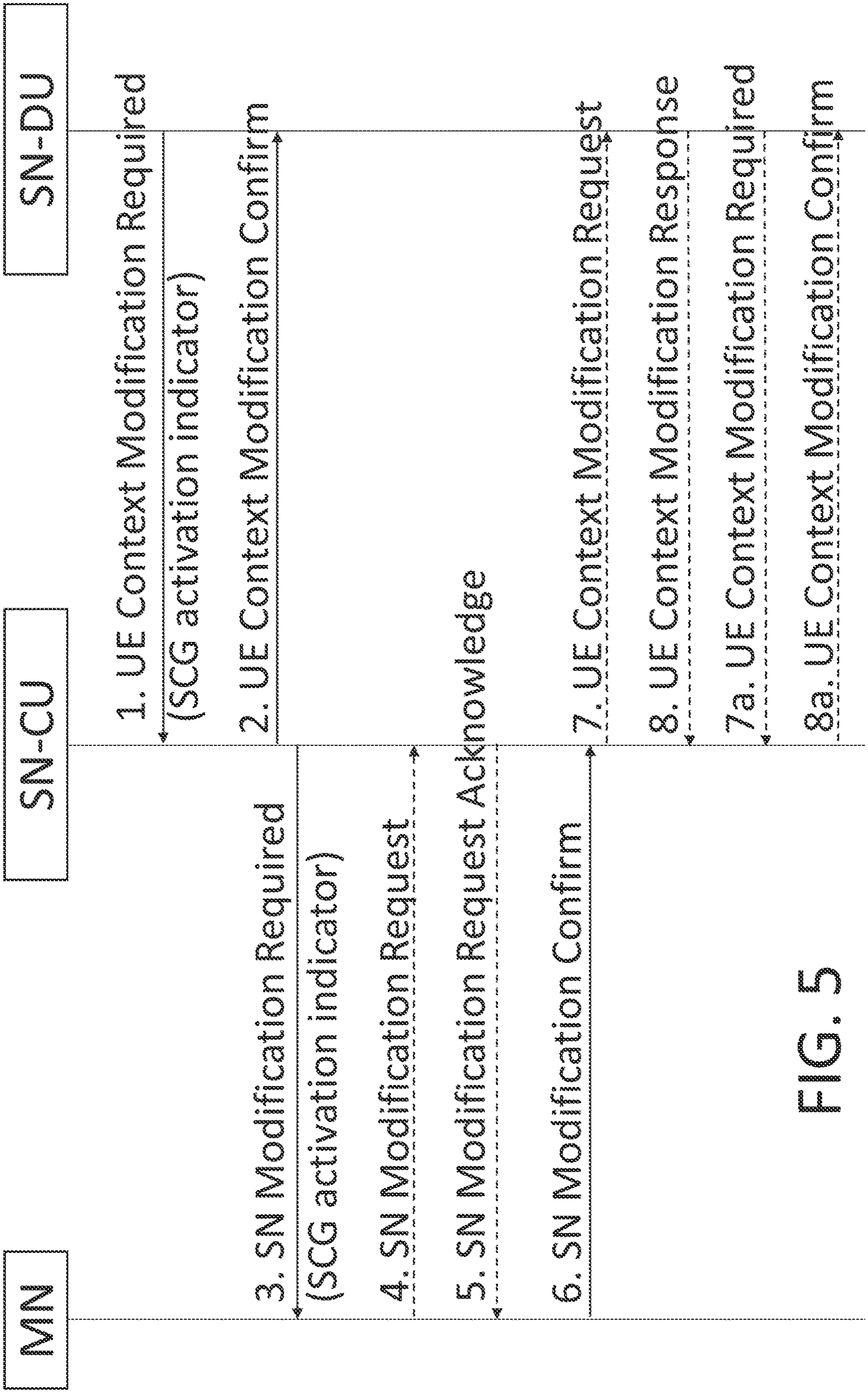
FIG. 5 shows a schematic diagram of another procedure for SCG activation according to an embodiment of the present disclosure.

Embodiment 5) Successful Operation of Du Initiated SCG Activation Based on Non-Nested Method FIG. 5 shows a schematic diagram of another procedure for SCG activation according to an embodiment of the present disclosure.

Step 1 in this embodiment is similar or identical to Step 1 in Embodiment 1, and is not described herein.

Step 2: The SN-CU sends a confirm message (e.g., a UE Context Modification Confirm message) to the SN-DU to indicate that the SCG is activated.

Steps 3 to 6 in this embodiment are similar or identical to Steps 2 to 5 in Embodiment 1, and are not described herein.

Step 7: A modification procedure (e.g., a UE Context Modification procedure) may be triggered by the SN-CU to further modify the established UE Context in some scenarios, such as modifying and releasing radio bearer resources. This procedure may not be triggered in some scenarios, e.g., no further modifications are required. For example, in an embodiment, the SN-CU may send a modification message (e.g., a UE Context Modification Request message) to the SN-DU.

Step 8: Following Step 7, the SN-DU may send a modification response message (e.g., a UE Context Modification Response message) to the SN-CU. Note that the operations in Steps 7 and 8 may be omitted on the basis of actual requirements.

Step 7*a*: A modification procedure (e.g., a UE Context Modification Required procedure) may be triggered by the SN-DU to further modify the established UE Context in some scenarios, such as modifying and releasing radio bearer resources. This procedure may not be triggered in some scenarios, e.g., no further modifications are required. For example, in an embodiment, the SN-DU may send a modification request message (e.g., a UE Context Modification Required message) to the SN-CU.

Step 8*a*: Following Step 7*a*, the SN-CU may send a modification confirm message (e.g., a UE Context Modification Confirm message) to the SN-DU. Note that the operations in Steps 7*a* and 8*a* may be omitted on the basis of actual requirements.

Note that the order of Steps 7 and 8 and Steps 7*a* and 8*a* can be altered, and the present disclosure is not limited to the embodiment above.

Figure 6:
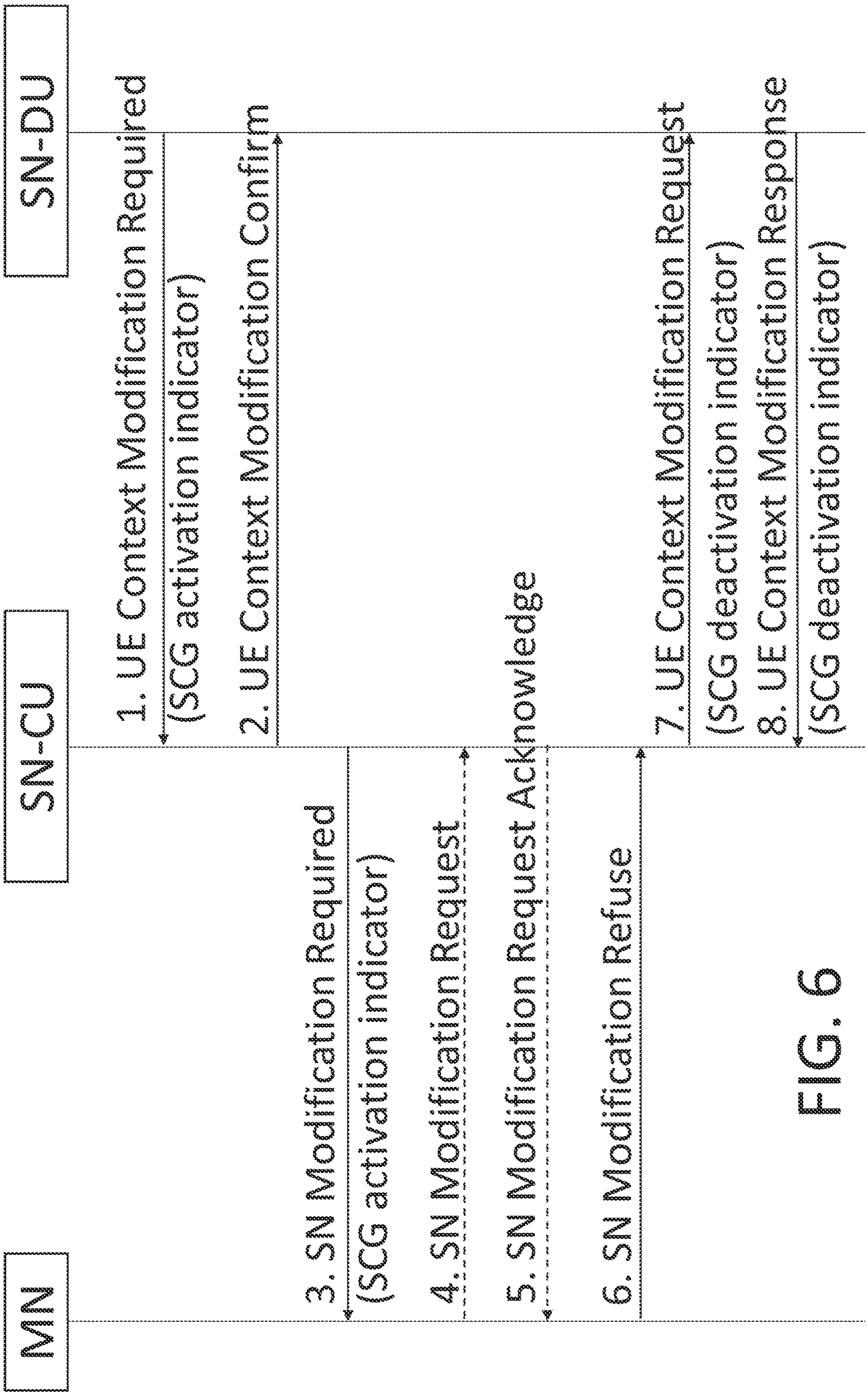
FIG. 6 shows a schematic diagram of another procedure for SCG activation according to an embodiment of the present disclosure.

Embodiment 6) Unsuccessful Operation of Du Initiated SCG Activation Based on Non-Nested Method FIG. 6 shows a schematic diagram of another procedure for SCG activation according to an embodiment of the present disclosure.

Steps 1 to 5 in this embodiment are similar or identical to Steps 1 to 5 in Embodiment 5, and are not described herein.

Step 6: The MN sends a refuse message (e.g., an SN Modification Refuse message) to the SN-CU to indicate that the SCG activation request is rejected. In an embodiment, the refuse message includes a cause value of "Requested SCG state not available" in the Cause IE.

Step 7: The SN-CU determines to deactivate the SCG, and sends a modification message (e.g., a UE Context Modification Request message) to the SN-DU to inform the SN-DU that the SCG is deactivated. In an embodiment, the modification message includes the SCG Activation Status IE with an indication "SCG deactivated" (e.g., an SCG deactivation indicator).

Step 8: The SN-DU uses the information in the modification message to configure the SCG resources, and sends a response message (e.g., a UE Context Modification Response message) to the SN-CU, including the SCG Activation Response IE with an indication "accept" (e.g., an SCG deactivation indicator).

Figure 7:
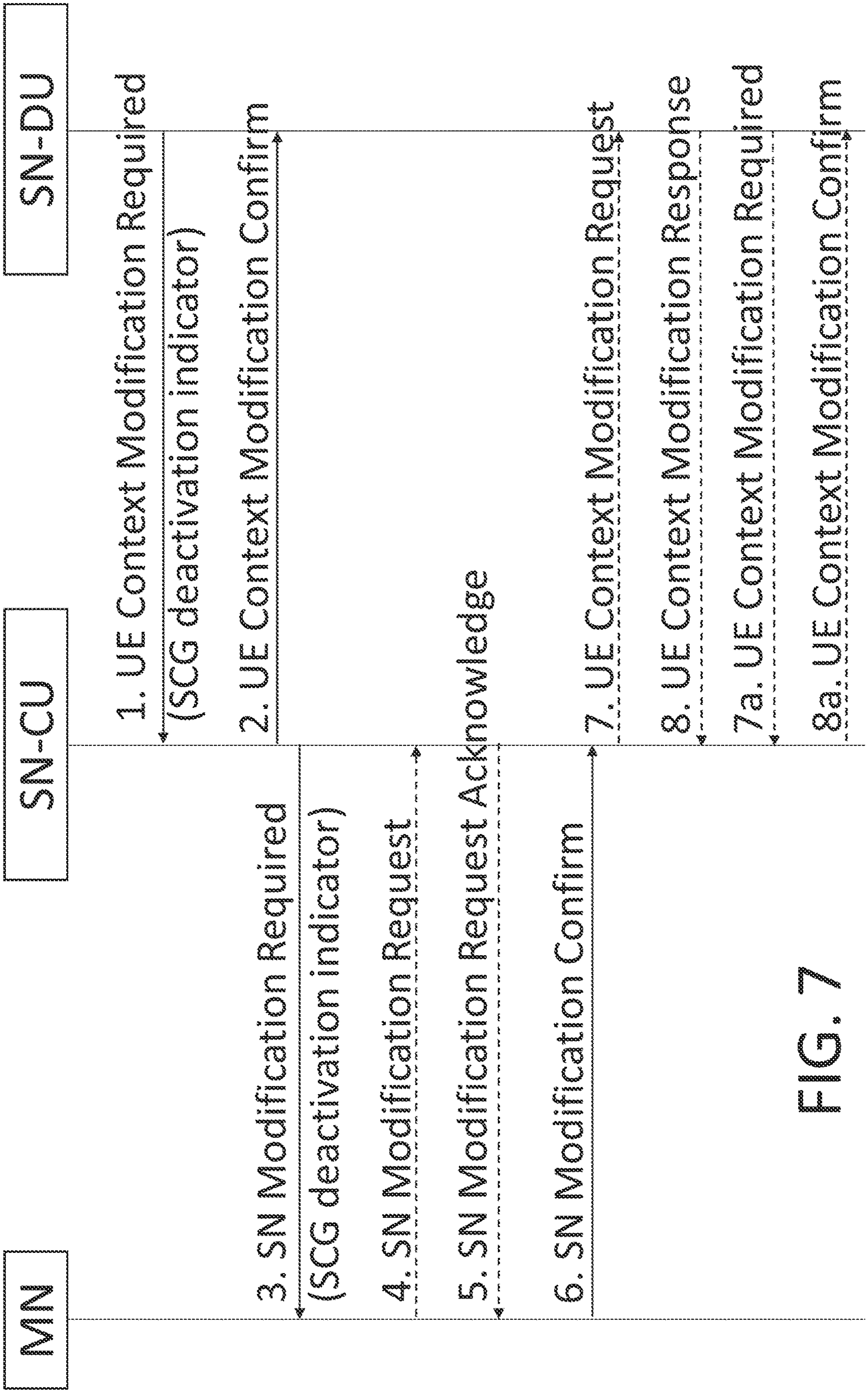
FIG. 7 shows a schematic diagram of another procedure for SCG deactivation according to an embodiment of the present disclosure.

Embodiment 7) Successful Operation of Du Initiated SCG Deactivation Based on Non-Nested Method FIG. 7 shows a schematic diagram of a procedure for SCG deactivation according to an embodiment of the present disclosure.

Step 1 in this embodiment is similar or identical to Step 1 in Embodiment 3, and is not described herein.

Step 2: The SN-CU sends a confirm message (e.g., a UE Context Modification Confirm message) to the SN-DU to indicate that the SCG is deactivated.

Steps 3 to 6 in this embodiment are similar or identical to Steps 2 to 5 in Embodiment 3, and are not described herein.

Steps 7 to 8 in this embodiment are similar or identical to Steps 7 to 8 in Embodiment 5, and are not described herein.

Steps 7*a* to 8*a* in this embodiment are similar or identical to Steps 7*a* to 8*a* in Embodiment 1, and are not described herein.

Figure 8:
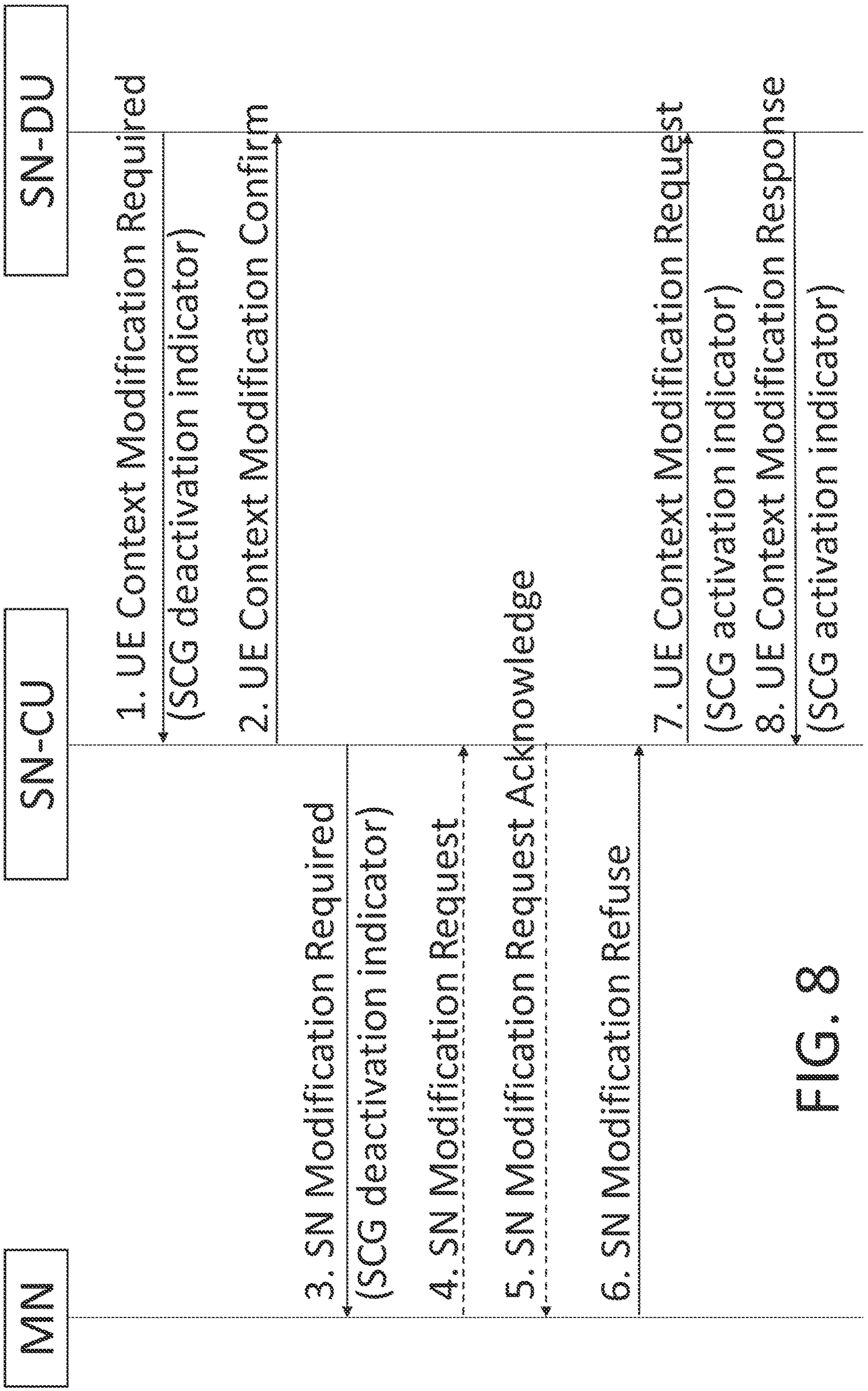
FIG. 8 shows a schematic diagram of another procedure for SCG deactivation according to an embodiment of the present disclosure.

Embodiment 8) Unsuccessful Operation of Du Initiated SCG Deactivation Based on Non-Nested Method FIG. 8 shows a schematic diagram of another procedure for SCG deactivation according to an embodiment of the present disclosure.

Steps 1 to 5 in this embodiment are similar or identical to Steps 1 to 5 in Embodiment 7, and are not described herein.

Step 6: The MN sends a refuse message (e.g., an SN Modification Refuse message) to the SN-CU to indicate that the SCG deactivation request is rejected. In an embodiment, the refuse message includes a cause value of "Requested SCG state not available" in the Cause IE.

Step 7: The SN-CU determines to activate the SCG, and sends a modification message (e.g., a UE Context Modification Request message) to the SN-DU to inform the SN-DU that the SCG is activated. In an embodiment, the modification message includes the SCG Activation Status IE with an indication "SCG activated" (e.g., an SCG activation indicator).

Step 8: The SN-DU uses the information in the modification message to configure the SCG resources, and sends a response message (e.g., a UE Context Modification Response message) to the SN-CU, including the SCG Activation Response IE with an indication "accept" (e.g., an SCG activation indicator).

In some embodiment of the present disclosure, a nested method for supporting DU initiated SCG deactivation and/or activation based on the enhanced UE context modification required message is provided. After receiving the assisting information for SCG deactivation or activation from the SN-DU, the SN-CU initiates a corresponding SCG deactivation or activation request to the MN based on the assisting information. If the request is accepted by the MN, the SN-CU responds with the UE Context Modification Confirm message to the SN-DU. If the request is rejected by the MN, the SN-CU responds with the UE Context Modification Refuse message to the SN-DU with the cause value of "Requested SCG state not available" in the Cause IE.

In some embodiment of the present disclosure, a non-nested method for supporting DU initiated SCG deactivation and/or activation based on the enhanced UE context modification required message is provided. After receiving the assisting information for SCG deactivation or activation from the SN-DU, the SN-CU responds with the UE Context Modification Confirm message to the SN-DU, and then initiates the corresponding SCG deactivation or activation request to the MN based on the assisting information. If the request is accepted by the MN, the SN-CU may not initiate any further procedures to the SN-DU, or in some scenarios, the SN-CU may initiate the UE context modification procedure to the SN-DU, such as modifying and releasing radio bearer resources. If the request is rejected by the MN, the SN-CU initiates the UE context modification procedure to the SN-DU to change the SCG deactivation or activation state.

In some embodiment of the present disclosure, The SN-CU is based on the assisting information from the SN-DU and/or based on a response from the MN to make the SCG deactivation and/or activation decision, and the UE context modification required message is enhanced to provide the assisting information for SCG deactivation and/or activation to the SN-CU.

Figure 9:
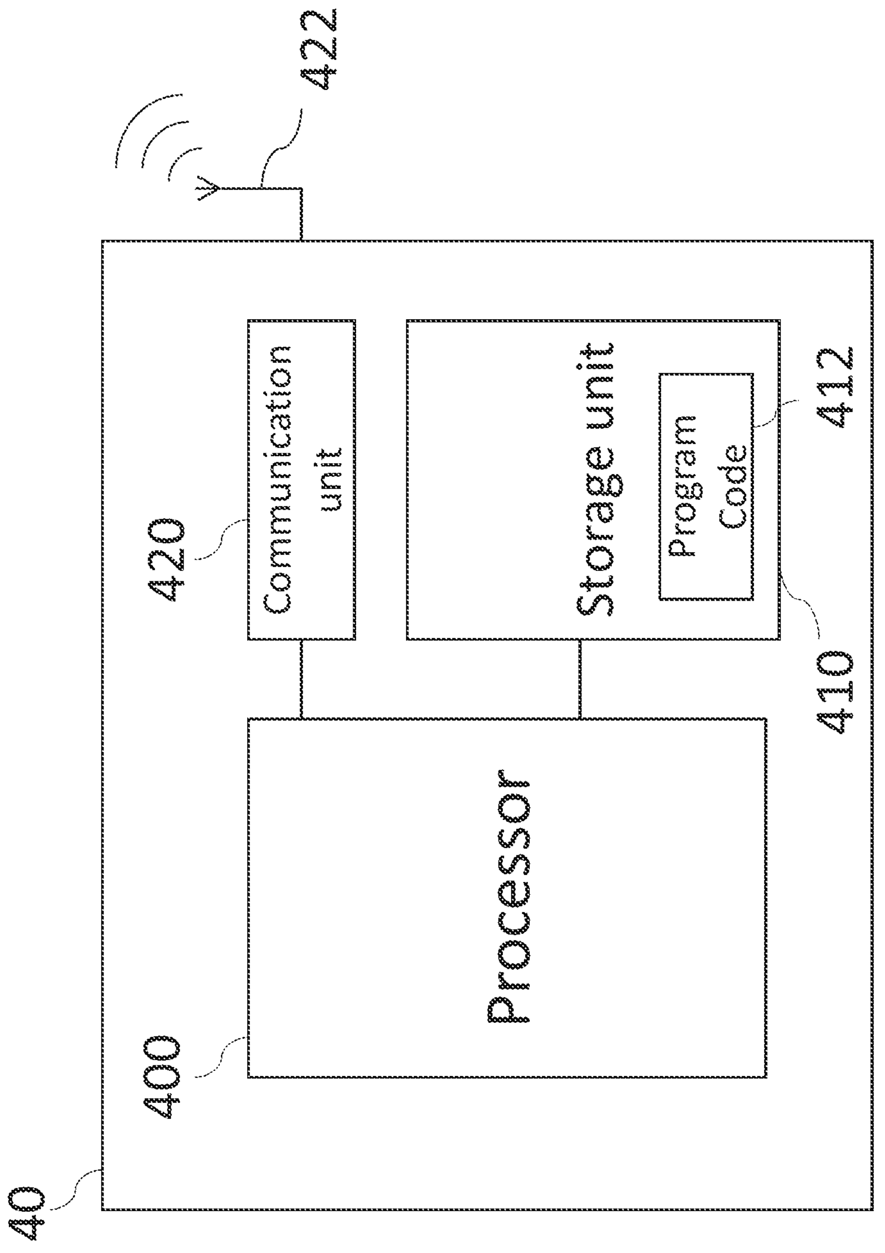
FIG. 9 shows an example of a schematic diagram of a wireless communication node according to an embodiment of the present disclosure.

FIG. 9 relates to a schematic diagram of a wireless communication node 40 (e.g., a network device) according to an embodiment of the present disclosure. The wireless communication node 40 may be a satellite, a base station (BS) (e.g., an MN, an SN-CU, or an SN-DU), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless communication node 40 may include (perform) at least one network function such as an access and mobility management function (AMF), a session management function (SMF), a user place function (UPF), a policy control function (PCF), an application function (AF), etc. The wireless communication node 40 may include a processor 400 such as a microprocessor or ASIC, a storage unit 410 and a communication unit 420. The storage unit 410 may be any data storage device that stores a program code 412, which is accessed and executed by the processor 400. Examples of the storage unit 412 include but are not limited to a SIM, ROM, flash memory, RAM, hard-disk, and optical data storage device. The communication unit 420 may be a transceiver and is used to transmit and receive signals (e.g., messages or packets) according to processing results of the processor 400. In an example, the communication unit 420 transmits and receives the signals via at least one antenna 422.

In an embodiment, the storage unit 410 and the program code 412 may be omitted. The processor 400 may include a storage unit with stored program code.

The processor 400 may implement any steps described in exemplified embodiments on the wireless communication node 40, e.g., via executing the program code 412.

The communication unit 420 may be a transceiver. The communication unit 420 may as an alternative or in addition be combining a transmitting unit and a receiving unit configured to transmit and to receive, respectively, signals, messages, or information to and from a wireless communication node (e.g., an MN, an SN-CU, or an SN-DU).

In some embodiments, the wireless communication node 40 may be used to perform the operations of the MN, SN-CU, or SN-DU described above. In some embodiments, the processor 400 and the communication unit 420 collaboratively perform the operations described above. For example, the processor 400 performs operations and transmit or receive signals through the communication unit 420.

A wireless communication method is also provided according to an embodiment of the present disclosure. In an embodiment, the wireless communication method may be performed by using a wireless communication node (e.g., an MN). In an embodiment, the wireless communication terminal may be implemented by using the wireless communication terminal 40 described above, but is not limited thereto.

Figure 10:
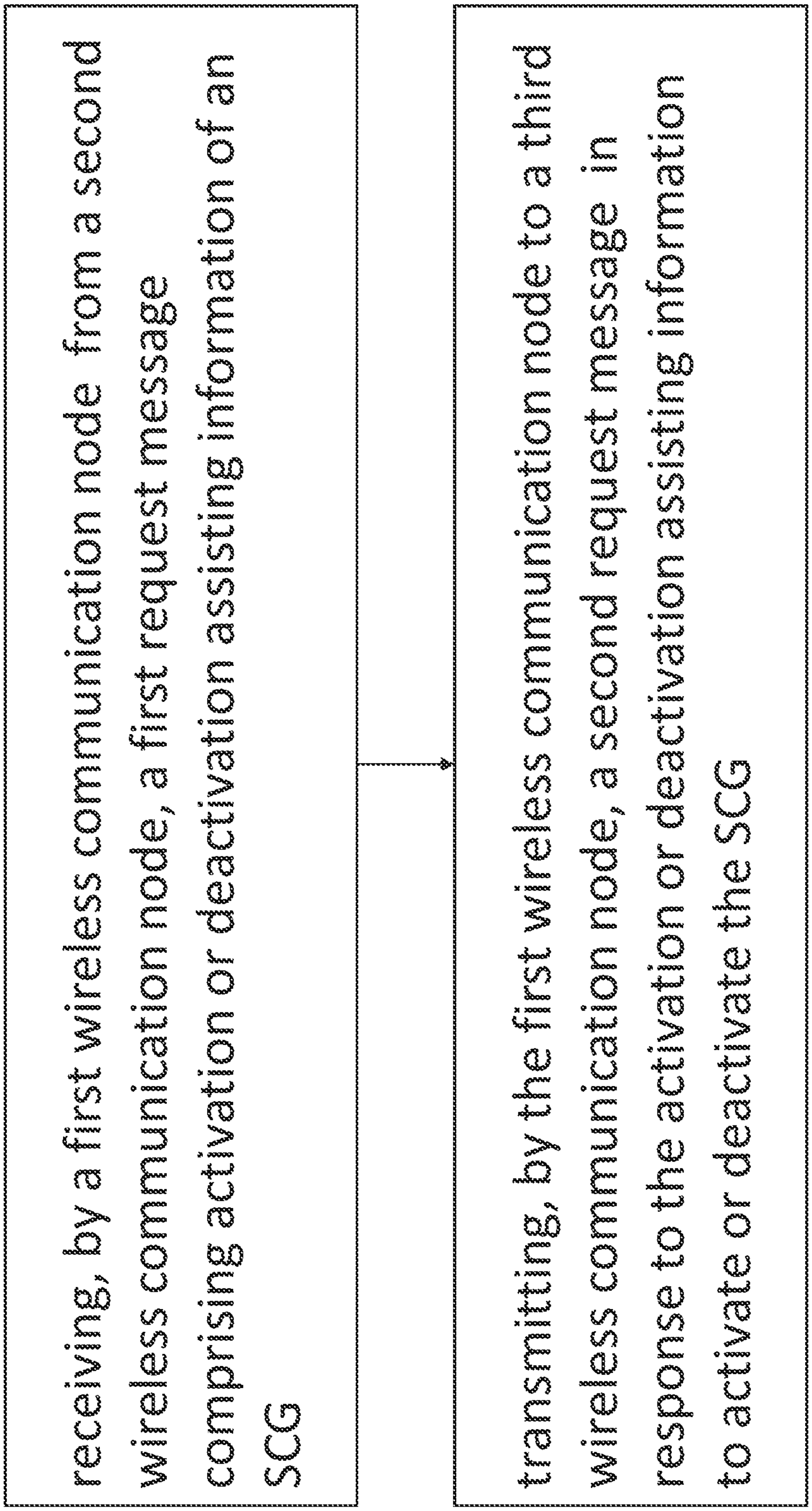
FIG. 10 shows a flowchart of a wireless communication method according to an embodiment of the present disclosure.

Referring to FIG. 10, in an embodiment, the wireless communication method includes: receiving, by a first wireless communication node from a second wireless communication node, a first request message comprising activation or deactivation assisting information of an SCG; and transmitting, by the first wireless communication node to a third wireless communication node, a second request message in response to the activation or deactivation assisting information to activate or deactivate the SCG.

Details in this regard can be ascertained with reference to the paragraphs above, and will not be repeated herein.

Another wireless communication method is also provided according to an embodiment of the present disclosure. In an embodiment, the wireless communication method may be performed by using a wireless communication node (e.g., an SN-CU). In an embodiment, the wireless communication terminal may be implemented by using the wireless communication terminal 40 described above, but is not limited thereto.

Referring to FIG. 11, in an embodiment, the wireless communication method includes: transmitting, by a second wireless communication node to a first wireless communication node, a first request message comprising activation or deactivation assisting information of an SCG to request the first wireless communication node to activate or deactivate the SCG and transmit a second request message to a third wireless communication node.

Details in this regard can be ascertained with reference to the paragraphs above, and will not be repeated herein.

A wireless communication method is also provided according to an embodiment of the present disclosure. In an embodiment, the wireless communication method may be performed by using a wireless communication node (e.g., an SN-DU). In an embodiment, the wireless communication terminal may be implemented by using the wireless communication terminal 40 described above, but is not limited thereto.

Referring to FIG. 12, in an embodiment, the wireless communication method includes: receiving, by a third wireless communication node from a first wireless communication node, a second request message to activate or deactivate an SCG. In an embodiment, the second request message is transmitted by the first wireless communication node according to a first request message from a second wireless communication node comprising activation or deactivation assisting information of the SCG.

Details in this regard can be ascertained with reference to the paragraphs above, and will not be repeated herein.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:

receiving, by a first wireless communication node from a second wireless communication node, a first request message comprising activation assisting information or deactivation assisting information of a secondary cell group (SCG); and transmitting, by the first wireless communication node to a third wireless communication node, a second request message in response to the activation assisting information or the deactivation assisting information to activate or deactivate the SCG, wherein the first wireless communication node receives a first response message from the third wireless communication node and transmits a confirm or refuse message to the second wireless communication node according to the first response message, or wherein the first wireless communication node receives a response message from the third wireless communication node and determines whether to transmit a deactivation request or an activation request to the second wireless communication node according to the response message, wherein the first wireless communication node is configured to receive a first refuse message from the third wireless communication node and transmit a second refuse message to the second wireless communication node to refuse an activation or a deactivation of the SCG according to the first refuse message, and wherein the first wireless communication node is configured to receive a release request message from the second wireless communication node to release a connection in response to refusing the activation or the deactivation of the SCG.

2. The wireless communication method of claim 1, wherein the first wireless communication node is configured to receive a first confirm message from the third wireless communication node and transmit a second confirm message to the second wireless communication node to confirm an activation or a deactivation of the SCG according to the first confirm message.

3. The wireless communication method of claim 1, wherein the first wireless communication node is configured to transmit a confirm message to the second wireless communication node to confirm an activation or a deactivation of the SCG before receiving the response message from the third wireless communication node.

4. The wireless communication method of claim 1, wherein the first wireless communication node is configured to receive the first refuse message from the third wireless communication node and transmit a deactivation request or an activation request to the second wireless communication node according to the first refuse message.

5. The wireless communication method of claim 1, wherein the first wireless communication node is configured to transmit a deactivation request to the second wireless communication node to request the second wireless communication node to deactivate the SCG that is activated in response to a refuse message from the third wireless communication node and the first request message comprising the activation assisting information, and wherein the first wireless communication node is configured to transmit an activation request to the second wireless communication node to request the second wireless communication node to activate the SCG that is deactivated in response to a refuse message from the third wireless communication node and the first request message comprising the deactivation assisting information.

6. The wireless communication method of claim 1, wherein the first wireless communication node is configured to receive a first modification request message from the third wireless communication node and transmit a first modification response message to the third wireless communication node according to the first modification request message.

7. The wireless communication method of claim 1, wherein the first wireless communication node is configured to transmit a second modification request message to the second wireless communication node and receive a second modification response message from the second wireless communication node, or the first wireless communication node is configured to receive the second modification request message from the second wireless communication node and transmit the second modification response message to the second wireless communication node according to the second modification request message.

8. A wireless communication method comprising:

transmitting, by a second wireless communication node to a first wireless communication node, a first request message comprising activation assisting information or deactivation assisting information of a secondary cell group (SCG), to request the first wireless communication node to activate or deactivate the SCG and transmit a second request message to a third wireless communication node, wherein the second wireless communication node is configured to receive a confirm or refuse message from the first wireless communication node, and a second response message is transmitted by the first wireless communication node according to a first response message provided by the third wireless communication node, or wherein the second wireless communication node is configured to receive a deactivation request or an activation request from the first wireless communication node in response to the first wireless communication node receiving a refuse message from the third wireless communication node, and wherein the second wireless communication node is configured to receive a second confirm message from the first wireless communication node to confirm an activation or a deactivation of the SCG, and the second confirm message is transmitted by the first wireless communication node according to a first confirm message provided by the third wireless communication node, wherein the second wireless communication node is configured to receive a second refuse message from the first wireless communication node to refuse an activation or a deactivation of the SCG, and the second refuse message is transmitted by the first wireless communication node according to a first refuse message provided by the third wireless communication node, and wherein the second wireless communication node is configured to transmit a release request message to the first wireless communication node to release a connection in response to the second refuse message.

9. The wireless communication method of claim 8, wherein the second wireless communication node is configured to receive a confirm message to confirm an activation or a deactivation of the SCG before receiving the deactivation request or the activation request from the first wireless communication node.

10. The wireless communication method of claim 8, wherein the second wireless communication node is configured to receive a deactivation request to deactivate the SCG that is activated in response to the first wireless communication node receiving a refuse message from the third wireless communication node and the first request message comprising the activation assisting information.

11. The wireless communication method of claim 8, wherein the second wireless communication node is configured to receive an activation request to activate the SCG that is deactivated in response to the first wireless communication node receiving a refuse message from the third wireless communication node and the first request message comprising the deactivation assisting information.

12. The wireless communication method of claim 8, wherein the second wireless communication node is configured to receive a second modification request message from the first wireless communication node and transmit a second modification response message to the first wireless communication node according to the second modification request message, or the second wireless communication node is configured to transmit the second modification request message to the first wireless communication node and receive the second modification response message from the first wireless communication node.

13. A wireless communication method comprising:

receiving, by a third wireless communication node from a first wireless communication node, a second request message to activate or deactivate a secondary cell group (SCG), wherein the second request message is transmitted by the first wireless communication node according to a first request message from a second wireless communication node comprising activation assisting information or deactivation assisting information of the SCG, wherein the third wireless communication node transmits a first response message to the first wireless communication node, to allow the first wireless communication node to transmit a confirm or refuse message to the second wireless communication node according to the first response message; or transmits a response message to the first wireless communication node, to allow the first wireless communication node to determine whether to transmit a deactivation request or an activation request to the second wireless communication node according to the response message, wherein the third wireless communication node is configured to transmit a refuse message to the first wireless communication node, to allow the first wireless communication node to activate or deactivate the SCG that is deactivated or activated in response to the refuse message, wherein the third wireless communication node is configured to transmit a refuse message to the first wireless communication node, to allow the first wireless communication node to request the second wireless communication node to deactivate the SCG that is activated in response to the first request message comprising the activation assisting information, and wherein the third wireless communication node is configured to transmit a refuse message to the first wireless communication node, to allow the first wireless communication node to request the second wireless communication node to activate the SCG that is deactivated in response to the first request message comprising the deactivation assisting information.

14. The wireless communication method of claim 13, wherein the third wireless communication node is configured to transmit a first confirm message to the first wireless communication node, to allow the first wireless communication node to transmit a second confirm message to the second wireless communication node to confirm an activation or a deactivation of the SCG according to the first confirm message.

15. The wireless communication method of claim 13, wherein the third wireless communication node is configured to transmit a first refuse message to the first wireless communication node, to allow the first wireless communication node to transmit a second refuse message to the second wireless communication node to refuse an activation or a deactivation of the SCG according to the first refuse message.

16. The wireless communication method of claim 13, wherein the third wireless communication node is configured to transmit a first modification request message to the first wireless communication node and receive a first modification response message from the first wireless communication node.

* * * * *